United States Patent
Ybarra et al.

(10) Patent No.: US 8,281,218 B1
(45) Date of Patent: Oct. 2, 2012

(54) DATA MANIPULATION ENGINE

(75) Inventors: Danny O. Ybarra, Mission Viejo, CA (US); Jeffrey O. Thomas, Long Beach, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 488 days.

(21) Appl. No.: 12/611,078

(22) Filed: Nov. 2, 2009

(51) Int. Cl.
*G06F 11/00* (2006.01)

(52) U.S. Cl. .......................................... 714/763

(58) Field of Classification Search .................... 714/763
See application file for complete search history.

(56) References Cited

U.S. PATENT DOCUMENTS

| | | | |
|---|---|---|---|
| 5,586,248 A | 12/1996 | Alexander et al. | |
| 5,742,752 A | 4/1998 | DeKoning | |
| 5,890,207 A | 3/1999 | Sne et al. | |
| 6,145,043 A | 11/2000 | Sych et al. | |
| 6,370,611 B1 | 4/2002 | Callison et al. | |
| 6,370,616 B1 * | 4/2002 | Callison et al. | 711/114 |
| 6,745,310 B2 * | 6/2004 | Chow et al. | 711/170 |
| 6,834,326 B1 | 12/2004 | Wang et al. | |
| 7,073,024 B1 * | 7/2006 | Chilton | 711/114 |
| 7,315,976 B2 | 1/2008 | Holt | |
| 7,334,081 B2 | 2/2008 | Espeseth et al. | |
| 7,380,115 B2 * | 5/2008 | Maine | 713/2 |
| 2008/0240421 A1 | 10/2008 | Gopal et al. | |
| 2010/0306634 A1 * | 12/2010 | Lincoln | 714/807 |
| 2011/0219150 A1 * | 9/2011 | Piccirillo et al. | 710/24 |

* cited by examiner

*Primary Examiner* — Marc Duncan

(57) ABSTRACT

Data storage devices are provided according to various embodiments of the present invention. In one embodiment, a data storage device comprises a host interface, a buffer, a storage media interface, and a data manipulation engine. The data manipulation engine comprises a receive pipe configured to read first and second data blocks from first and second locations in the buffer and to check the validity of the first and second data blocks, an arithmetic logic unit configured to perform a logic operation on first and second user data of the first and second data blocks, respectively, to generate third user data, and a transmit pipe configured to receive the third user data from the arithmetic logic unit, to generate and append a third checksum to the third user data to produce a third data block, and to write the third data block to a third location in the buffer.

17 Claims, 7 Drawing Sheets

DATA MANIPULATION ENGINE

BACKGROUND OF THE INVENTION

Data storage devices are commonly used to store data in computers, data bases, digital video recorders, and other devices.

FIG. 1 shows a typical data storage device 110 including a storage media 125, which may comprise a hard disk, solid state memory (e.g., flash memory), or other type of memory. The data storage device 110 also includes a host interface 115, a buffer 130, a storage media interface 120, and a microprocessor 140. The host interface 115 interfaces the data storage device 110 to a host device (e.g., a computer processor). The storage media interface 120 reads data from and writes data to the storage media 125. For the example where the storage media 125 comprises a hard disk, the storage media interface 120 may include a read/write head to magnetically read data from and write data to the hard disk. The buffer 130 temporarily stores data between the storage media interface 120 and the host interface 115.

The microprocessor 140 controls operations of the data storage device 110 to execute read/write commands from the host device. For a host read command, the microprocessor 140 instructs the storage media interface 120 to retrieve the requested data from the storage media 125 and store the data in the buffer 130 and instructs the host device interface 115 to send the data from the buffer 130 to the host device. For a host write command, the microprocessor 140 instructs the host device interface 115 to store the received data in the buffer 130 and instructs the storage media interface 120 to write the data from the buffer 130 to the storage media 125.

There is a need for improved data protection, data movement and/or data manipulation in data storage devices.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
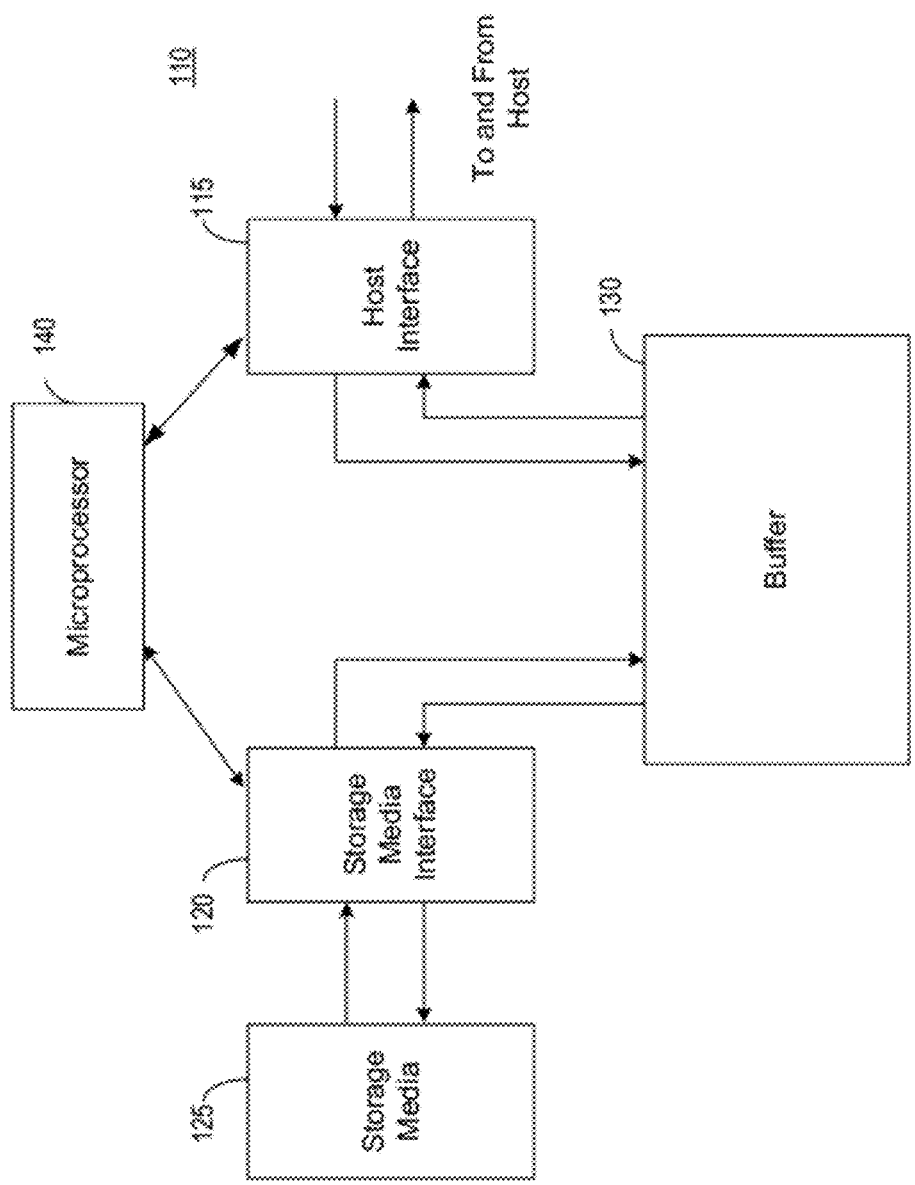
FIG. 1 is a block diagram of a data storage device.
Figure 2:
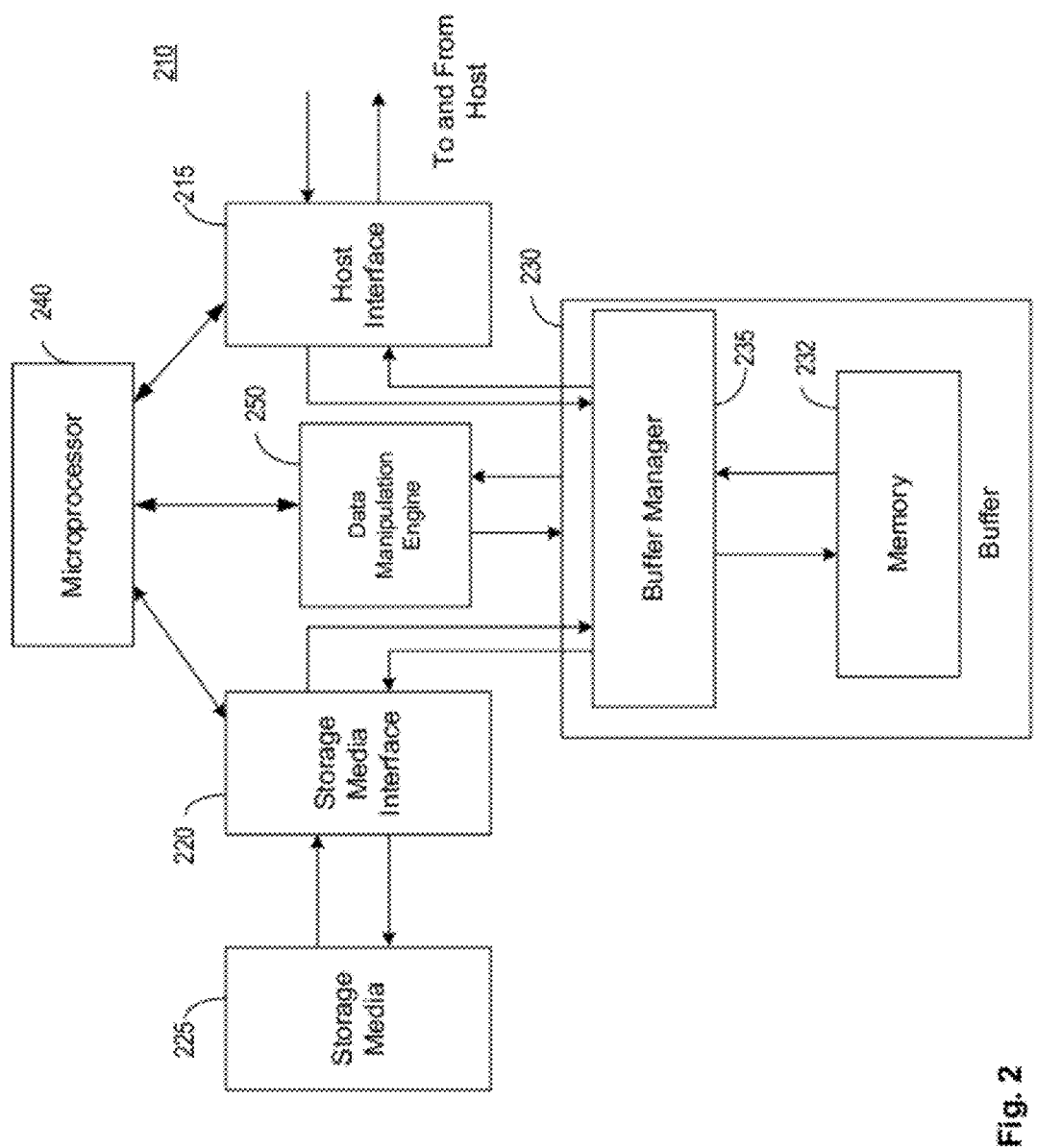
FIG. 2 is a block diagram of a data storage device including a data manipulation engine according to an embodiment of the present invention.

FIG. 2 shows a data storage device 210 according to an embodiment of the present invention. The data storage device 210 includes a host interface 215, a buffer 230, a storage media interface 220 and a storage media 225. The storage media 225 may comprise a hard disk, solid state memory (e.g., flash memory) or other storage media. The storage media interface 220 is configured to write data to and read data from the storage media 225. For the example where the storage media 225 comprises a hard disk, the storage media interface 220 may include a write/read head for magnetically writing data to and magnetically reading data from the hard disk. The host interface 215 interfaces the data storage device 210 with a host device and may be configured to receive data from the host device to be written to the storage media 225 and to send data read from the storage media 225 to the host device. The buffer 230 may be used to temporarily store data between the host interface 215 and the storage media interface 220, as discussed further below. Data in the data storage device 210 may be stored in units of data blocks.

The data storage device 210 also includes a data manipulation engine 250 and a microprocessor 240. The data manipulation engine 250 may be configured to perform data manipulation operations (e.g., logic operations), data movement operations and/or data protection operations on data within the data storage device 210, as discussed further below. In one embodiment, the data manipulation engine 250 may read two data blocks from the buffer 230, perform a logic operation (OR, XOR and/or AND operation) on the two data blocks resulting in a new data block, and write the new data block to the buffer 230. In this example, the two data blocks are the operands of the logic operation and the new data block is the resultant of the logic operation. Examples of other operations that may be performed by the data manipulation engine 250 are provided below.

The microprocessor 240 is configured to manage the flow of data among the storage media interface 220, the buffer 230, the data manipulation engine 250 and the host interface 215, as discussed further below. The microprocessor 240 may manage the flow of data to execute read/write commands from the host device. For example, when the host interface 215 receives a read command from the host device, the microprocessor 240 may instruct the storage media interface 220 to read data requested by the read command from the storage media 225 and to store the read data in the buffer 230. The microprocessor 240 may then instruct the host interface 215 to read the data from the buffer 230 and to send the data to the host device.

The microprocessor 240 may also issue commands to the data manipulation engine 250 to perform a specific data manipulation operation (e.g., OR, XOR and/or AND operation) and/or other operation on data stored in the buffer 230, as discussed further below. For example, the microprocessor 240 may issue a command instructing the data manipulation engine 250 to retrieve two data blocks from two different source addresses in the buffer 230, to perform a specified operation (e.g., OX, XOR and/or AND operation) on the two data blocks, and to store the resulting new data block to a destination address in the buffer 230. Examples of other commands are provided below.

The buffer 230 may further comprise a memory 232 and a buffer manager 235. The memory 232 may comprise dynamic random access memory (DRAM), RAM and/or other memory. The buffer manager 235 interfaces the memory 232 with the storage media interface 220, the data manipulation engine 250 and the host interface 215.

Various data protection schemes may be employed to protect the integrity of data in the data storage device 210. In an embodiment, the data storage device 210 may locally generate and append local checksums to data blocks in the data storage device 210 to protect the integrity of data blocks within the data storage device 210. For example, one of the components in the data storage device 210 may generate a local checksum for a data block and append the local checksum to the data block. The local checksum may be generated from data in the data block using an error correction code (ECE) algorithm, a cyclic redundancy check (CRC) algorithm or other error detection/correction algorithm. The local checksum may later be checked by the same component that generated the local checksum or other component of the data storage device 210 to verify that the data block is valid (i.e., the data block has not been corrupted within the data storage device 210). For example, the host interface 215 may generate and append a local checksum to a data block received from the host device. The data manipulation engine 250, host interface 115 and/or storage media interface 220 may later check the local checksum to verify that the data block is valid (i.e., the data block received by the host interface 215 has not been corrupted within the data storage device 210).

In an embodiment, data received by the host interface 215 from the host device may include global checksums. The global checksums may be generated by the host device or other device external to the data storage device 210. For example, the host device may generate a global checksum for a data block to be sent to the data storage device 210 to protect the integrity of the data block. The host device may generate the global checksum from data in the data block using an error correction code (ECE) algorithm, a cyclic redundancy check (CRC) algorithm or other error detection/correction algorithm. The data storage device 210 may check the global checksum to verify that the data block is valid (e.g., the data was not corrupted in a data path between the host device and the data storage device 210).

Figure 3A:
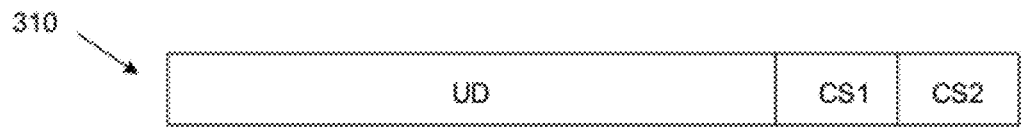
FIG. 3A illustrates an exemplary data block according to an embodiment of the present invention.

FIG. 3A illustrates an example of a data block 310 that may be used in various embodiments of the present invention. The data block 310 may include user data UD and a global checksum CS1 generated from the user data UD. As discussed above, the global checksum may be generate by the host device. The data block 310 may also include a local checksum CS2 that is generated in the data storage device 210 and appended to the data block 310. For example, the host interface 215 may receive the data block 310 with the user data UD and the global checksum CS1 from the host device. The host interface 215 may then generate and append the local checksum CS2 to the received data block to provide local data integrity protection. The data block 310 may include other fields in addition to those shown in FIG. 3A.

A component (e.g., data manipulation engine 250 or storage media interface 220) of the data storage device 210 may use the global checksum CS1 and/or local checksum CS2 to check the validity of the user data UD in a data block. The component may have knowledge of the lengths and relative locations of the UD, CS1 and CS2 fields in a data block 310 to identify the user data UD, the global checksum CS1 and/or the local checksum CS2 in the data block 310.

In an embodiment, the host device may address data blocks sent to and retrieved from the data storage device 210 using logical block addresses (LBAs). The LBA for a data block may be included in the data block. In this embodiment, when the data storage device 210 receives a data block with an LBA from the host device, the microprocessor 210 may keep track of the physical address of the data block in the data storage device 210 by maintaining an address map that maps the LBA to the physical address of the data block in the data storage device 210. The physical address may be an address in the buffer 230 and/or an address in the storage media 225. When the data storage device 210 receives a read command from the host device addressed with an LBA, the microprocessor 210 may determine the physical address of the corresponding data block in the data storage device 210 and coordinate operations of the storage media interface 220, the buffer 230 and/or the host interface 215 to retrieve and send the corresponding data block to the host device. LBAs allow the host device or other external device to address data blocks in the data storage device 210 without having to know the physical locations of the data blocks in the data storage device 210.

Figure 4:
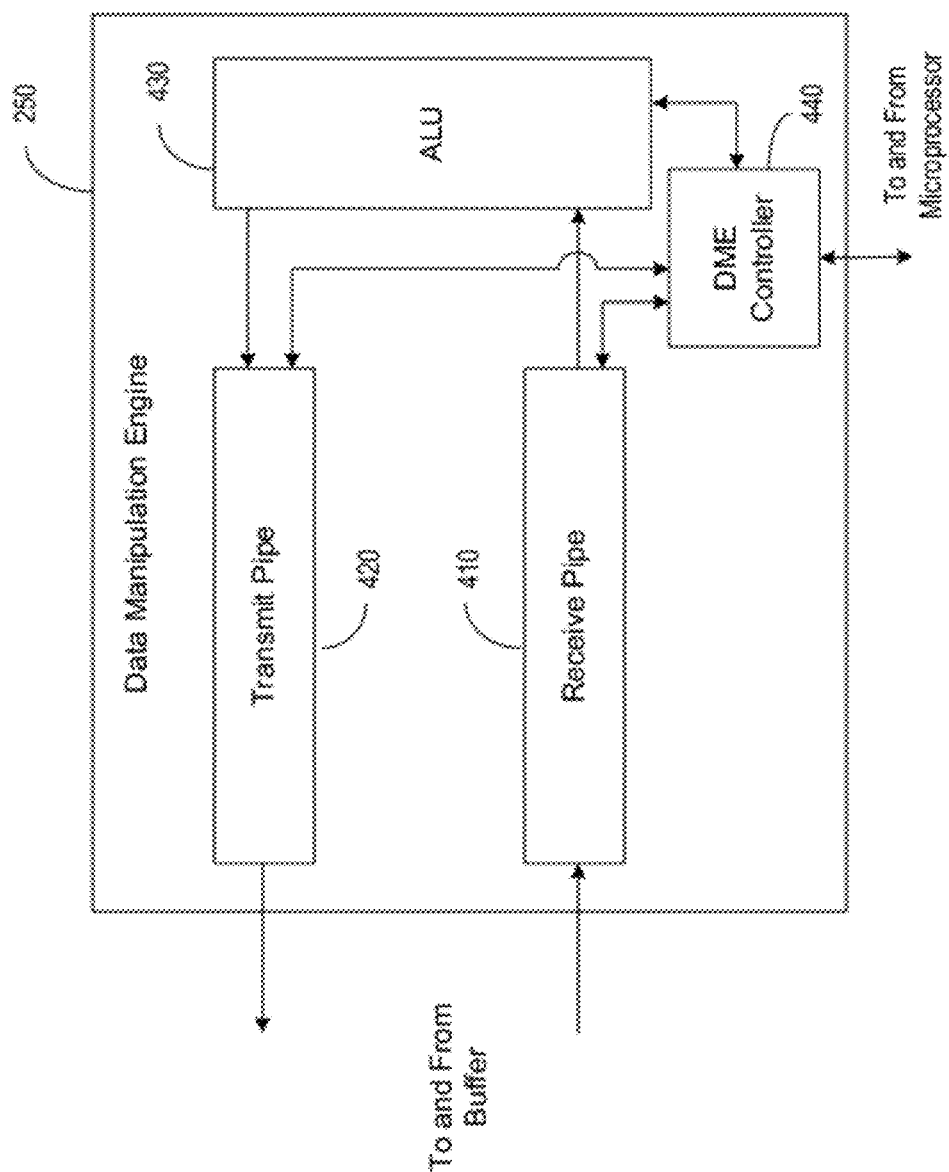
FIG. 4 is a block diagram of the data manipulation engine according to an embodiment of the present invention.

FIG. 4 shows the data manipulation engine 250 according to an embodiment of the present invention. The data manipulation engine 250 includes a receive pipe 410, an arithmetic logic unit (ALU) 430, a transmit pipe 420, and a data manipulation engine (DME) controller 440. The DME controller 440 is configured to receive a command from the microprocessor 240 and control the receive pipe 410, the (ALU) 430 and the transmit pipe 420 to execute the command, as discussed further below.

In an embodiment, the receive pipe 410 is configured to retrieve one or more data blocks from the buffer 230 at locations specified by the DME controller 440, and to check the validity of the one or more data blocks using the global checksum and/or local checksum of the one or more data blocks. If the receive pipe 410 determines that a data block is invalid, then the receive pipe 410 may send an error indication to the DME controller 440. The receive pipe 410 may forward the one or more data blocks to the ALU 430. In one embodiment, the receive pipe 410 may forward just the user data in the one or more data blocks to the ALU 430.

The ALU 430 is configured perform a logic operation (e.g., OR, XOR and/or AND operation) specified by the DME controller 440 on the one or more data blocks. The ALU 430 may also perform other operations, including a COPY operation, a VERIFY operation, and/or a FILL operation, as discussed further below. The ALU 430 outputs a data block resulting from the operation to the transmit pipe 420. For example, when the ALU 430 performs a logic operation (e.g., OR, XOR and/or AND operation) on two data blocks from the receive pipe 410, the ALU 430 may output a new data block resulting from the logic operation to the transmit pipe 420. In one example, the ALU 430 may perform a bitwise OR, XOR and/or AND operation, in which each user data bit in one of the data blocks is ORed, XORed and/or ANDed with a corresponding user data bit in the other data block.

The transmit pipe 420 may generate a local checksum and/or global checksum for the new data block outputted from the ALU 430. For example, the transmit pipe 420 may generate the local checksum and/or global checksum from data (e.g., user data) in the new data block by using the same algorithms used to generate the local checksum and/or global checksums for the one or more data blocks received by the receive pipe 410.

In one embodiment, a command received by the DME controller 440 from the microprocessor 240 may include first and second source addresses identifying the locations of first and second data blocks, respectively, in the buffer 230. The command may also include a logic operation (e.g., OR, XOR and/or AND operation) to be performed on the two data blocks. The command may further include a destination address identifying a location in the buffer 230 at which a new data block resulting from the logic operation is to be stored.

Figure 3B:
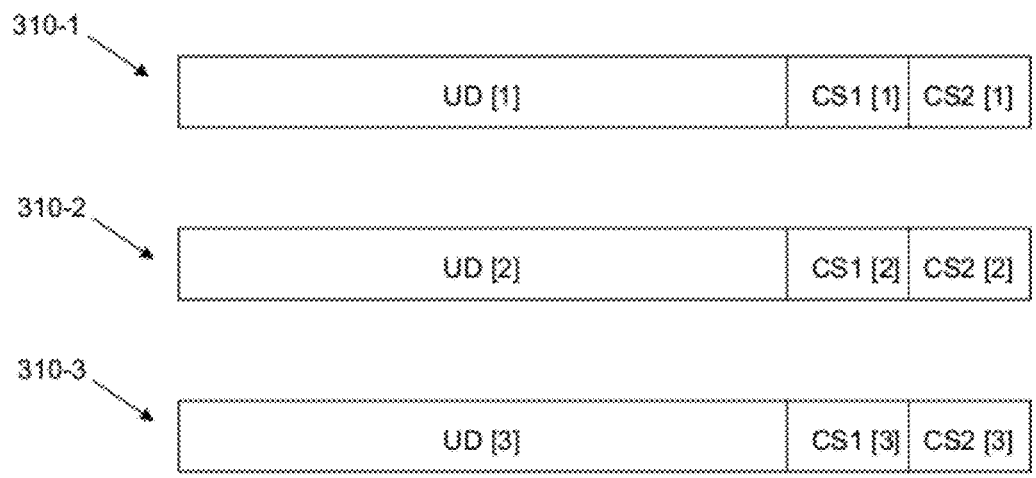
FIG. 3B illustrates exemplary data blocks according to an embodiment of the present invention.

In this embodiment, upon receiving the command, the DME controller 440 may instruct the receive pipe 410 to read the first and second data blocks from the first and second source addresses in the buffer 230, respectively. The receive pipe 410 may read the first and second data blocks in serial and/or in parallel from the buffer 230. FIG. 3B shows an example of the first and second data blocks 310-1 and 310-2. In this example, each data block 310-1 and 310-2 includes user data UD[1] and UD[2], a global checksum CS1[1] and CS1[2], and a local checksum CS2[1] and CS2[2].

The receive pipe 410 may then check the validity of the first and second data blocks by checking their respective global checksums and/or local checksums. If the receive pipe 410 determines that one or both of the first and second data blocks are invalid, then the receive pipe 410 may send an error signal to the DME controller 440, which may then send an error signal to the microprocessor 240. The receive pipe 410 forwards the user data of the first and second data blocks to the ALU 430.

The DME controller 440 may instruct the ALU 430 to perform the logic operation specified by the command on the user data of the first and second data blocks. For example, the logic operation may be a bitwise OR, XOR and/or AND operation, in which each user data bit in the first data block is ORed, XORed and/or ANDed with a corresponding user data bit in the second data block. The ALU 430 may then output a new data block resulting from the logic operation to the transmit pipe 420. The new data block may include user data bits, where each user data bit results from a pair of corresponding bits of the first and second data blocks that are ORed, XORed and/or ANDed together.

The transmit pipe 420 may then generate a global checksum and/or local checksum from the user data in the new data block outputted from the ALU 430 and append the global checksum and/or local checksum to the new user data block. The DME controller 440 may then instruct the transmit pipe 420 to store the new data block in the buffer 230 at the destination address specified by the command. FIG. 3B shows an example of the new data block 310-3. In this example, the new data block 310-3 includes user data UD[3], a global checksum CS1[3] and CS1[2], and a local checksum CS2[3]. The user data UD[3] may be outputted from the ALU 430, and the global checksum CS1[3] and the local checksum CS2[3] may be generated by the transmit pipe 420 from the user data UD[3].

Thus, the data manipulation engine 250 is able to receive commands from the microprocessor 240, and, based on the received commands, perform logic operations on data blocks in the buffer 230 and store the resultant new data blocks in the buffer 230. This allows the microprocessor 240 to offload these functions to the data manipulation engine 250 and frees up the microprocessor 240 to perform other functions, thereby improving the performance of the data storage device 210.

In addition, the data manipulation engine 250 provides data protection by checking the validity of the data blocks on which the logic operations are performed, and by generating new checksums (e.g., global and/or local checksums) for the resultant new data blocks to protect the data integrity of the new data blocks.

The data manipulation engine 250 may include a command queue or register (shown in FIG. 6) for storing a plurality of commands from the microprocessor 240. The DME controller 440 may then retrieve and execute commands from the command queue one at a time. The DME controller 440 may also generate and send a signal to the microprocessor 240 indicating when a command has been completed.

As discussed above, the data manipulation engine 250 may perform other operations, including a COPY operation, a VERIFY operation, and/or a FILL operation based on commands from the microprocessor 240.

For a COPY operation, the data manipulation engine 250 may copy a data block from one location in the buffer 230 to another location in the buffer 230. A command from the microprocessor 240 for a COPY operation may include a source address of a data block in the buffer 230 and a destination address in the buffer 230 to which the data block is to be copied.

In this example, the DME controller 440 may instruct the receive pipe 410 to retrieve the data block from the source address specified by the command. The receive pipe 410 may then check the global checksum and/or local checksum of the data block to verify that the data block is valid. The receive pipe 410 may forward the block data to the ALU 430, which routes the data block to the transmit pipe 420. Alternatively, the receive pipe 420 may forward the data block to the transmit pipe 420 directly.

The transmit pipe 420 may generate a new global checksum and/or local checksum for the data block and append the new global and/or local checksum to the data block. The transmit pipe 420 may generate the new global checksum and/or local checksum from user data in the data block. Alternatively, the transmit pipe 420 may use the global checksum and/or local checksum of the data block received by the receive pipe. The DME controller 440 may then instruct the transmit pipe 420 to write the data block to the destination address in the buffer 230 specified by the command.

In an embodiment, a COPY operation may copy a data block associated with a particular LBA to a different LBA. In this embodiment, a command from the microprocessor 240 for a COPY operation may include a new LBA for the data block in addition to the source address and the destination address discussed above. In this embodiment, the DME controller 440 may instruct the ALU 430 or the transmit pipe 420 to insert the new LBA specified by the command in the data block. The transmit pipe 420 may then generate a new global checksum and/or local checksum based on the user data and the new LBA in the data block. The transmit pipe 420 may then append the new global checksum and/or local checksum to the data block and write the data block to the destination address in the buffer 230 specified by the command. In this embodiment, the microprocessor 240 may map the new LBA to the destination address of the data block in the buffer 230.

In an embodiment, a COPY operation may also copy a data block from one source address in the buffer 230 to multiple destination addresses in the buffer 230. In this embodiment, a command from the microprocessor 240 for the COPY operation may include multiple destination addresses in addition to the source address. In one embodiment, the data manipulation engine 250 may copy the data block to the multiple destination addresses one at a time. In this embodiment, for each copy of the data block, the receive pipe 410 may read the data block from the source address and check the validity of the data block, and the transmit pipe 420 may write the data block to one of the multiple destination addresses. This process may be repeated until the data block is copied to all of the multiple destination addresses specified by the command.

For a VERIFY operation, the data manipulation engine 250 may compare two data blocks from the buffer 230 to verify whether the two data blocks are the same. A command from the microprocessor 240 for a VERIFY operation may include first and second source addresses in the buffer 230 for first and second data blocks, respectively.

In this embodiment, the DME controller 440 may instruct the receive pipe 410 to retrieve the first and second data blocks from the first and second source addresses, respectively, specified by the command. The receive pipe 410 may then check the global checksums and/or local checksums of the first and second data blocks to verify that the first and second data blocks are valid. The receive pipe 440 forwards the first and second data blocks to the ALU 430. The DME controller 440 may then instruct the ALU 430 to verify whether the first and second data blocks are the same. The ALU 430 may do this by comparing bits in the first data block with corresponding data bits in the second data block. After completing the comparison, the ALU 430 may send a signal to the DME controller indicating whether the first and second data blocks are the same. The DME controller may then send a signal to the microprocessor 240 indicating whether the first and second data blocks are the same.

For a FILL operation, the data manipulation engine 250 may generate patterns of bits and write the patterns of bits to one or more destination addresses in the buffer 230. A command from the microprocessor 240 for a FILL operation may include one or more destination addresses. In this embodiment, the ALU 430 may generate patterns of bits based on a program. For example, the patterns of bits may be generated by incrementing and/or repeating a pattern of bits. The ALU 430 may output the generated patterns of bits to the transmit pipe 420. The transmit pipe 420 may then write the patterns of bits to the one or more destination addresses specified by the command for the FILL operation.

The patterns of bits in the buffer 230 may then be written to the storage media 225 by the storage media interface 220 to fill all of or a portion of the storage media 225 with the patterns of bits. The patterns of bits stored in the storage media 225 may be used to test the integrity of the storage media 225 (e.g., defect mapping), for example, by reading out the patterns of bits from various locations in the storage media 225 and detecting changes in the patterns of bits. The patterns of bits may also be used for other purposes as well.

The microprocessor 240 may issue commands to the data manipulation engine 250 in coordination with data transfers to and from the buffer 230 to perform various functions. The functions may include Small Computer System Interface (SCSI) functions such as VERIFY, WRITE AND VERIFY, WRITE SAME, XREAD, XDWRITE, XDWRITEREAD and/or XPWRITE functions, just to name a few.

For example, the microprocessor 240 may perform an XPWRITE function that XORs a data block from the storage media 225 with a data block from the host device. The microprocessor 240 may accomplish this by coordinating data transfers to and from the buffer 230 with issuance of an XOR command to the data manipulation engine 250. In this example, the microprocessor 240 may instruct the storage media to write a first data block from the storage media 225 to a first source address in the buffer 230. The microprocessor 240 may also instruct the host interface 215 to write a second data block from the host device to a second source address in the buffer 230. The microprocessor 240 may then issue an XOR command to the data manipulation engine 250 instructing the data manipulation engine 250 to retrieve the first and second data blocks from the first and second sources addresses, respectively, to perform an XOR operation on the first and second data blocks, and to write the resultant data block to a destination address in the buffer 230.

When the data manipulation engine 250 completes the execution of the XOR command, the data manipulation engine 250 may send a signal to the microprocessor 240 indicating that the XOR command has been executed. The microprocessor 240 may then instruct the storage media interface 220 to write the resultant data block in the destination address to the storage media 225 and/or instruct the host interface 215 to send the resultant data block to the host device.

Figure 5:
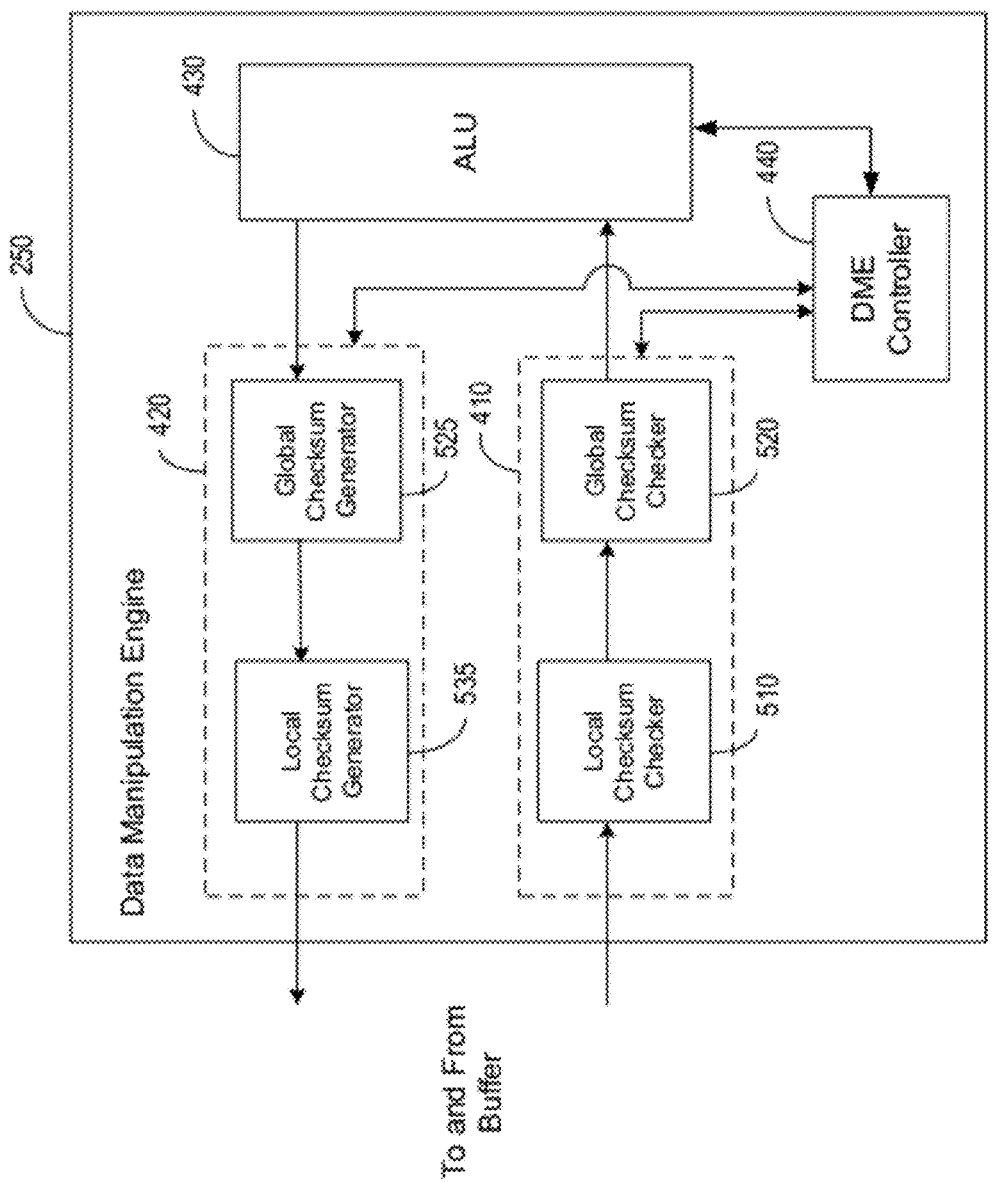
FIG. 5 is a block diagram of the data manipulation engine according to another embodiment of the present invention.

FIG. 5 shows the data manipulation engine 250 according to an embodiment of the present invention. In this embodiment, the receive pipe 410 includes a local checksum checker 510 and a global checksum checker 520. The transmit pipe 420 includes a global checksum generator 525 and a local checksum generator 535.

The local checksum checker 510 is configured to retrieve a data block from a source address in the buffer 230 based on an instruction from the DME controller 440 and check the validity of the user data in the data block. If the data block is invalid, then the local checksum checker 510 may send a signal to the DME controller 440 indicating that the data block is invalid. This may occur, for example, when the data in the data block is corrupted in the buffer 230 and/or storage media 225 of the data storage device 210. The DME controller 440 may then send a signal to the microprocessor 240 indicating that the data block is invalid.

The global checksum checker is 520 is configured to check the validity of the user data in the data block using the global checksum. If the user data is invalid, then the global checksum checker 520 may send a signal to the DME controller 440 indicating that the user data is invalid. The DME controller 440 may then send a signal to the microprocessor 240 indicating that the user data is invalid. The global checksum checker 520 may then forward the user data to the ALU 430.

The ALU 430 may receive the user data of two data blocks from the receive pipe 410 and perform a logic operation (e.g., XOR, OR and/or AND operation) on the user data of the two data blocks. The ALU may then output a new data block resulting from the logic operation to the global checksum generator 525.

The global checksum generator 525 is configured to generate a global checksum for the new data block outputted by the ALU 430 and append the generated global checksum to the new data block. The local checksum generator 535 is configured to generate a local checksum for the new data block and append the generated local checksum to the new data block. The local checksum generator 535 may then write the new data block to a destination address in the buffer 230 based on an instruction from the DME controller 440.

Figure 6:
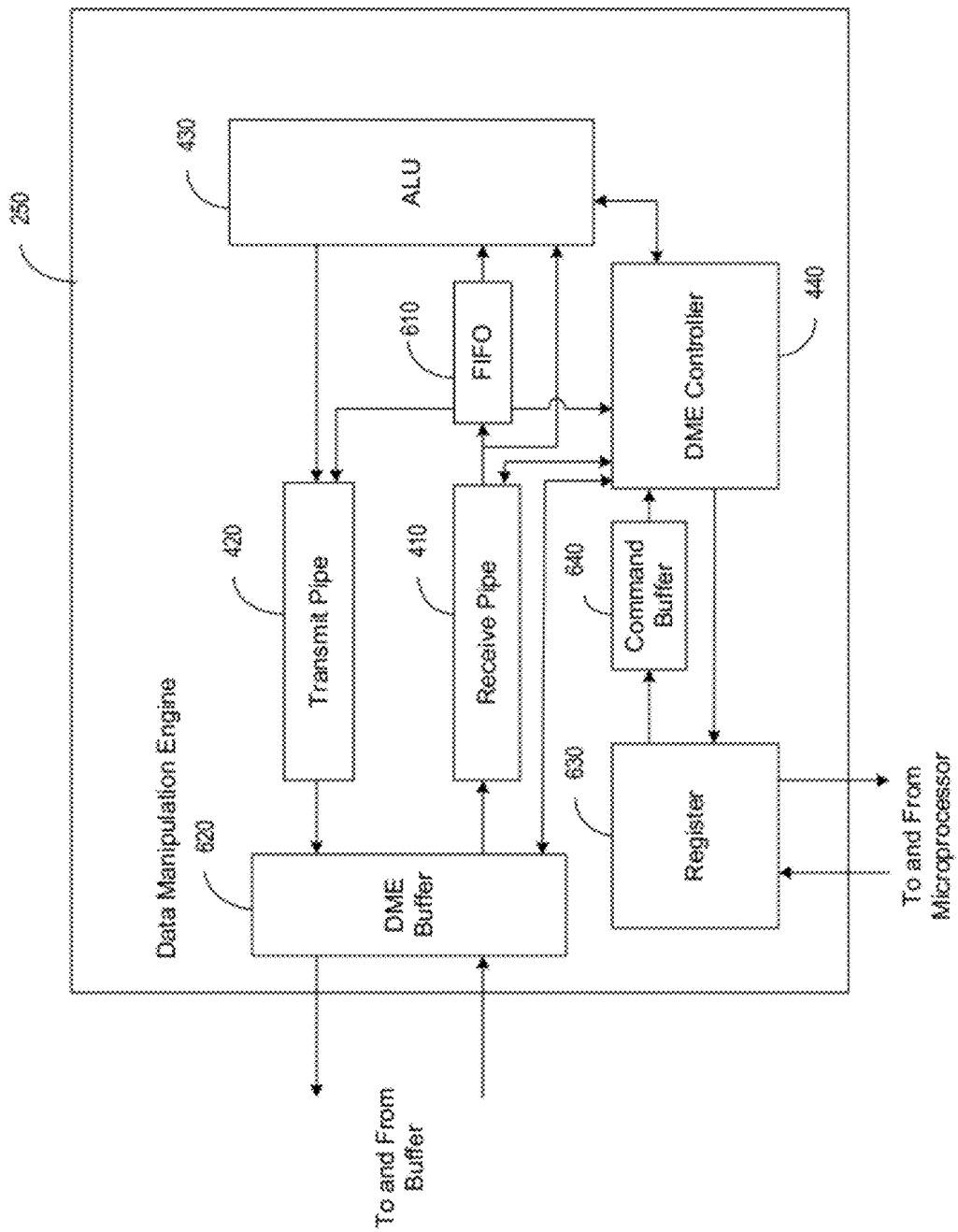
FIG. 6 is a block diagram of the data manipulation engine according to still another embodiment of the present invention.

FIG. 6 shows the data manipulation engine 250 according to an embodiment of the present invention. In this embodiment, the data manipulation engine 250 includes a DME buffer 620, a First-In-First-Out (FIFO) buffer 610, a register 630 and a command buffer 640.

In this embodiment, the DME buffer 620 is configured to retrieve data blocks from source addresses in the buffer 230 based on instructions from the DME controller 440. The receive pipe 410 may then read the data blocks from the DME buffer 620 to perform the functions described above. In this embodiment, the DME buffer 620 may be used for data rate shifting, for example, when data is read out from the buffer 230 at a faster rate than the receive pipe 410 processes data.

The FIFO buffer 610 is configured to temporarily store user data from the receive pipe 410. For example, when the data manipulation engine 250 performs a logic operation on two data blocks, the receive pipe 410 may process one data block at a time. In this example, the FIFO buffer 610 may temporarily store user data from one of the data blocks while the receive pipe 410 processes the other data block. The FIFO buffer 610 may output user data for one of the data blocks to the ALU 430 while the receive pipe 410 outputs user data for the other data block to the ALU 430.

In this embodiment, each data block may be divided into a plurality of segments, and the data manipulation engine 250 may process data blocks segment-by-segment. The size of each segment may be much smaller than the size of a data block. For example, each segment may have a size of 64 Bytes while a data block may have a size of approximately 4 K Bytes.

In one embodiment, the receive pipe 410 may process a segment of a first data block and temporarily store the user data in the segment of the first data block in the FIFO buffer 430. The receive pipe 410 may then process a segment of a second data block. For each segment, the receive pipe 410 may compute local and global checksum values based on the user data in the segment. The FIFO buffer 430 may output the segment of the first data block to the ALU 430 while the receive pipe 420 outputs the segment of the second data block to the ALU 430.

The ALU 430 may then perform a logic operation on the segments of the first and second data blocks resulting in a segment of a new data block. The ALU may output the segment of the new data block to the transmit pipe 420. The transmit pipe 420 may compute local and global checksum values for the segment of the new data block. The transmit pipe 420 may then forward the segment of the new data block to the DME buffer 620, which writes the segment of the new data block to a destination address in the buffer 230.

The above process may be repeated until all of the segments in each of the data blocks have been processed by the data manipulation engine 250. To determine whether a data block is valid, the receive pipe 410 may temporarily store computed local and global checksum values (e.g., in internal memory) and later compare the computed local and global checksum values with local and global checksum values in the local and global checksum fields of the data block. The transmit pipe 420 may temporarily store computed local and global checksum values (e.g., in internal memory) and later insert the computed local and global checksum values in the local and global checksum fields of the new data block.

Processing data blocks in segments advantageously allows the data manipulation engine 250 to the process the data blocks using much less memory space. This is because much less memory space is needed to temporarily store segments of the data blocks during processing compared with the entire data blocks.

The register 630 may be configured to receive commands from the microprocessor 240. The register 630 may store a received command in the command buffer 640 to await execution by the DME controller 440. The register 630 may also receive signals from the DME controller 440 and send the signals to the microprocessor 240. For example, the register 630 may send a signal to the microprocessor 240 indicating the successful completion of a command, a signal indicating an invalid data block (i.e., protection error), and/or a signal indicating whether two data blocks match for a VERIFY command.

Figure 7:
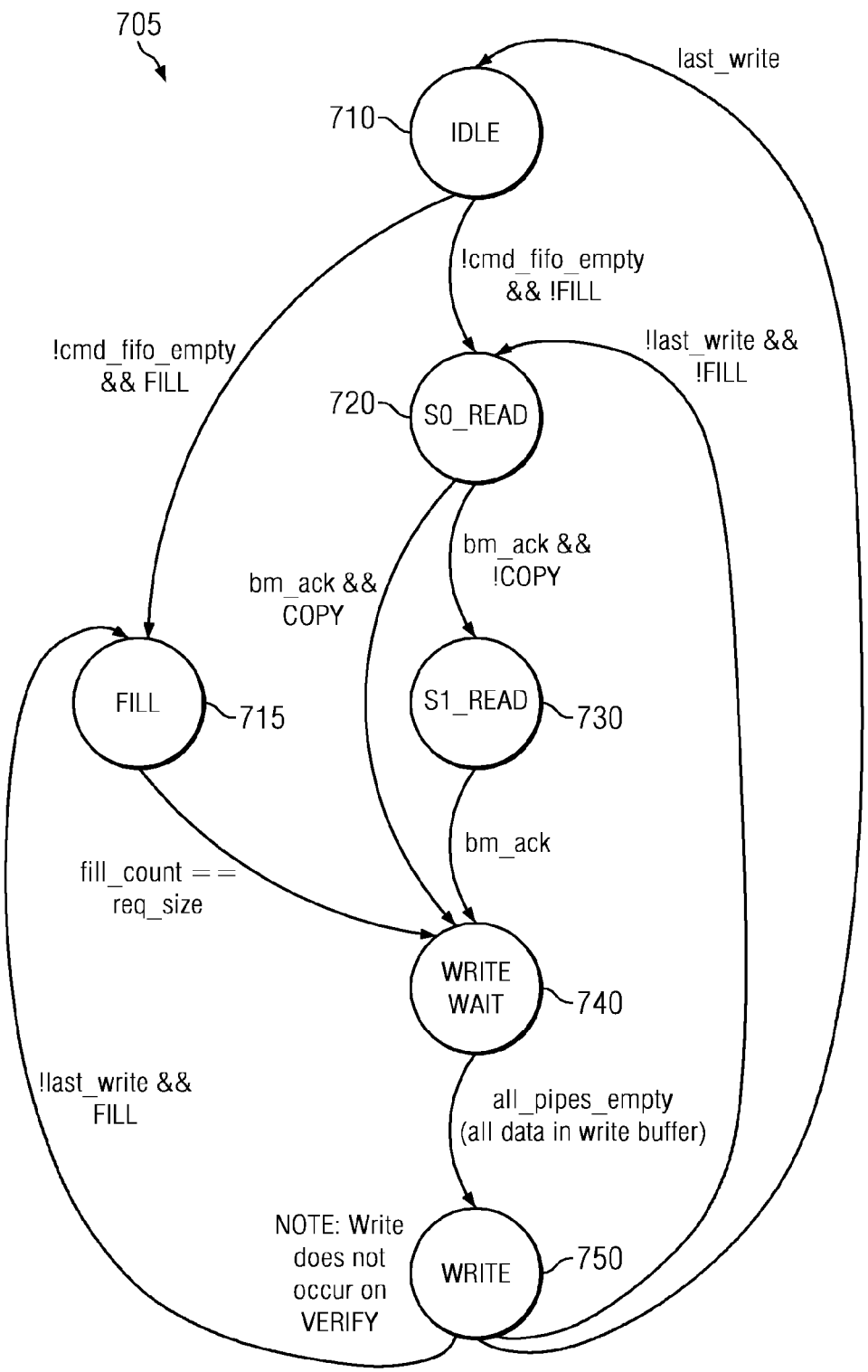
FIG. 7 is a state diagram for the data manipulation engine according to an embodiment of the present invention.

FIG. 7 shows a state diagram 705 for the data manipulation engine 250 according to an embodiment of the present invention.

While in the IDLE state 710, the data manipulation engine 250 waits for a command to arrive from the microprocessor 240. The data manipulation engine 250 exists the IDLE state 710 when the command buffer 640 is not empty. If a received command is a FILL command, then the data manipulation engine goes to the FILL state 715. Otherwise, the data manipulation engine 250 goes to the S0_READ STATE 720.

When in the S0_READ state 720, the data manipulation engine 250 reads data from a first source address in the buffer 230 for a first data block. The data may be in a segment of the first data block. If the command is a COPY command, then the data manipulation engine 250 goes to the WRITE WAIT state 740. Otherwise, the data manipulation engine goes to the S1_READ state 730.

When in the S1_READ state 730, the data manipulation engine 250 reads data from a second source address in the buffer 230 for a second data block. The data may be in a segment of the second data block. The data manipulation engine 250 then goes to the WRITE WAIT state 740.

When the data manipulation engine 250 is in the FILL state 715, the data manipulation engine 250 generates a fill pattern (e.g., pattern of bits), which is sent to the transmit pipe 420 of the data manipulation engine 250.

When in the WRITE WAIT state 740, the data manipulation engine 250 waits for data to be processed by the transmit pipe 420 (e.g., for the transmit pipe to generate and append checksums to data outputted from the ALU 430). The data outputted from the transmit pipe 420 may be stored in the DME buffer 620 to await writing to the buffer 230.

When in the WRITE state 750, the data manipulation engine 250 writes the data in the DME buffer 620 to the buffer 230. The data manipulation engine 250 exists the WRITE state 750 when the data has been sent to the buffer 230. If this is the last write for a command, then the data manipulation engine 250 will go next to the IDLE state 710 to look for another command. Otherwise, on a FILL command, the data manipulation engine 250 will next go to the FILL state 715, and, on another command (e.g., XOR command), the data manipulation engine 250 will go to the S0_READ state 720 to read the next segment for the first data block, and so forth.

The data manipulation engine 250 may be implemented using one or more processors for executing instructions and may further include memory, such as a volatile or non-volatile memory, for storing data (e.g., data being processed) and/or instructions. The instructions may be executed by the one or more processors to perform the various functions of the data manipulation engine 250 described in the disclosure. The one or more processors may include a microcontroller, a Digital Signal Processor (DSP), an Application Specific Integrated Circuit (ASIC), a Field Programmable Gate Array (FPGA), hard-wired logic and/or a combination thereof.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. A data storage device, comprising:
a buffer;
a host interface configured to store data from a host device in the buffer, to send data from the buffer to the host device, to receive a first user data from the host device, to write the first user data to the buffer, to generate a first checksum based on the first user data received from the host device, and to write the first checksum to the buffer;
a storage media interface configured to store data from storage media in the buffer, to send data from the buffer to the storage media, to receive a second user data from the storage media, and to write the second user data to the buffer; and
a data manipulation engine configured to receive a command, the data manipulation engine comprising:
a receive pipe configured to read first and second data blocks from first and second locations in the buffer based on the received command, the first data block including the first user data and the first checksum and the second data block including the second user data and a second checksum, and to check the validity of the first and second user data based on the first and second checksums, respectively;
an arithmetic logic unit configured to receive the first and second user data from the receive pipe, and to perform a logic operation on the first and second user data to generate third user data based on the received command; and
a transmit pipe configured to receive the third user data from the arithmetic logic unit, to generate a third checksum based on the third user data, to append the third checksum to the third user data to produce a third data block, and to write the third data block to a third location in the buffer based on the received command.

2. The data storage device of claim 1, wherein the logic operation is selected from a group consisting of an exclusive OR (XOR) operation, an AND operation, and an OR operation.

3. The data storage device of claim 1, wherein the storage media interface is configured to read the third data block from the buffer and to store the third data block in the storage media.

4. The data storage device of claim 1, wherein the receive pipe is configured to read fourth and fifth data blocks from the buffer, the fourth data block including fourth user data and a fourth checksum and the fifth data block including fifth user data and a fifth checksum, and to check the validity of the fourth and fifth user data based on the fourth and fifth checksums, respectively, and the arithmetic logic unit is configured to receive the fourth and fifth user data from the receive pipe, and to verify whether the fourth and fifth user data are the same.

5. The data storage device of claim 1, wherein the receive pipe is configured to read a fourth data block corresponding to a first logical block address from a fourth location in the buffer, the fourth data block including fourth user data and a fourth checksum, and to check the validity of the fourth user data based on the fourth checksum, the arithmetic logic unit is configured to route the fourth user data to the transmit pipe, and the transmit pipe is configured to generate a fifth checksum based on the fourth user data and a second logical block address, to append the fifth checksum to the fourth user data to produce a fifth data block, and to write the fifth data block to a fifth location in the buffer.

6. The data storage device of claim 5, wherein the transmit pipe is configured to generate a sixth checksum based on the fourth user data and a third logical block address, to append the sixth checksum to the fourth user data to produce a sixth data block, and to write the sixth data block to a sixth location in the buffer.

7. The data storage device of claim 1, wherein the storage media comprises a hard disk.

8. The data storage device of claim 1, wherein storage media comprises a solid state memory.

9. A method for manipulating data in a data manipulation engine of a storage media controller, the storage media controller comprising a buffer, a host interface configured to store data from a host device in the buffer and to send data from the buffer to the host device and storage media interface configured to store data from storage media in the buffer and to send data from the buffer to the storage media, the method comprising:
receiving a command;
reading first and second data blocks from first and second locations in the buffer based on the received command, the first data block including first user data and a first checksum and the second data block including second user data and a second checksum;
checking the validity of the first and second user data based on the first and second checksums, respectively;
performing, based on the received command, a logical operation on the first and second user data engine to generate third user data;
generating a third checksum based on the third user data;
appending the third checksum to the third user data to produce a third data block;
writing the third data block to a third location in the buffer based on the received command;
generating a data pattern; and
writing the generated data pattern to the buffer.

10. The method of claim 9, wherein the logic operation is selected from a group consisting of an exclusive OR (XOR) operation, an AND operation, and an OR operation.

11. The method of claim 9, further comprising:
reading fourth and fifth data blocks from the buffer, the fourth data block including fourth user data and a fourth checksum and the fifth data block including fifth user data and a fifth checksum;
checking the validity of the fourth and fifth user data based on the fourth and fifth checksums, respectively; and
verifying whether the fourth and fifth user data are the same.

12. The method of claim 9, further comprising:
reading a fourth data block corresponding to a first logical block address from a fourth location in the buffer, the fourth data block including fourth user data and a fourth checksum;
checking the validity of the fourth user data based on the fourth checksum;
generating a fifth checksum based on the fourth user data and a second logical block address;
appending the fifth checksum to the fourth user data to produce a fifth data block; and
writing the fifth data block to a fifth location in the buffer.

13. The method of claim 9, wherein the storage media comprises a hard disk.

14. The method of claim 9, wherein the storage media comprises a solid state memory.

15. A data storage device, comprising:
a buffer;
a host interface configured to store data from a host device in the buffer, to send data from the buffer to the host device, to receive first user data and a global checksum from the host device, to generate a local checksum based on the first user data received from the host device, and to write a first data block to the buffer;
a storage media interface configured to store data from storage media in the buffer and to send data from the buffer to the storage media; and
a data manipulation engine configured to receive a command, the data manipulation engine comprising:
a receive pipe configured to read the first data block and a second data block from a first location and a second location in the buffer based on the received command, the first data block including the first user data and a first checksum and the second data block including second user data and a second checksum, and to check the validity of the first and second user data based on the first and second checksums, respectively, wherein the first checksum includes the local checksum and the global checksum;
an arithmetic logic unit configured to receive the first and second user data from the receive pipe, and to perform a logic operation on the first and second user data to generate third user data based on the received command; and
a transmit pipe configured to receive the third user data from the arithmetic logic unit, to generate a third checksum based on the third user data, to append the third checksum to the third user data to produce a third data block, and to write the third data block to a third location in the buffer based on the received command.

16. A data storage device, comprising:
a buffer;
a host interface configured to store data from a host device in the buffer and to send data from the buffer to the host device;
a storage media interface configured to store data from storage media in the buffer and to send data from the buffer to the storage media; and
a data manipulation engine configured to receive a command, the data manipulation engine comprising:
a receive pipe configured to read first and second data blocks from first and second locations in the buffer based on the received command, the first data block including first user data and a first checksum and the second data block including second user data and a second checksum, and to check the validity of the first and second user data based on the first and second checksums, respectively;
an arithmetic logic unit configured to receive the first and second user data from the receive pipe, to perform a logic operation on the first and second user data to generate third user data based on the received command, and to generate a data pattern; and
a transmit pipe configured to receive the third user data from the arithmetic logic unit, to generate a third checksum based on the third user data, to append the third checksum to the third user data to produce a third data block, to write the third data block to a third location in the buffer based on the received command, to receive the data pattern from the arithmetic logic unit, to generate a fourth checksum based on the data pattern, to append the fourth checksum to the data pattern to produce a fourth data block, and to write the fourth data block to the buffer.

17. A data storage device, comprising:
a buffer;
a host interface configured to store data from a host device in the buffer and to send data from the buffer to the host device;
a storage media interface configured to store data from storage media in the buffer and to send data from the buffer to the storage media; and
a data manipulation engine configured to receive a command, the data manipulation engine comprising:
a receive pipe configured to read first and second data blocks from first and second locations in the buffer based on the received command, the first data block including first user data and a first checksum and the second data block including second user data and a second checksum, to check the validity of the first and second user data based on the first and second checksums, respectively, and to perform error correction on the first user data based on the first checksum when the receive pipe determines that the first user data is invalid;
an arithmetic logic unit configured to receive the first and second user data from the receive pipe, and to perform a logic operation on the first and second user data to generate third user data based on the received command;
a transmit pipe configured to receive the third user data from the arithmetic logic unit, to generate a third checksum based on the third user data, to append the third checksum to the third user data to produce a third data block, and to write the third data block to a third location in the buffer based on the received command; and
a controller configured to receive the command from a microprocessor, to control the logical operations performed by the arithmetic logic unit based on the received command, and to send an error message to the microprocessor when the receive pipe is unable to correct the first user data.

* * * * *